Sept. 4, 1923.
M. FORER
1,467,283
FENDER GUARD
Filed July 11, 1922
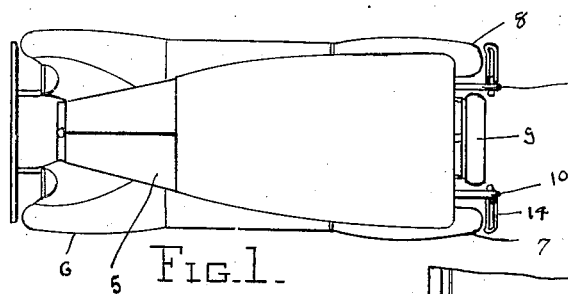
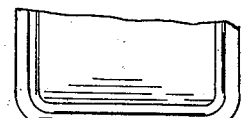
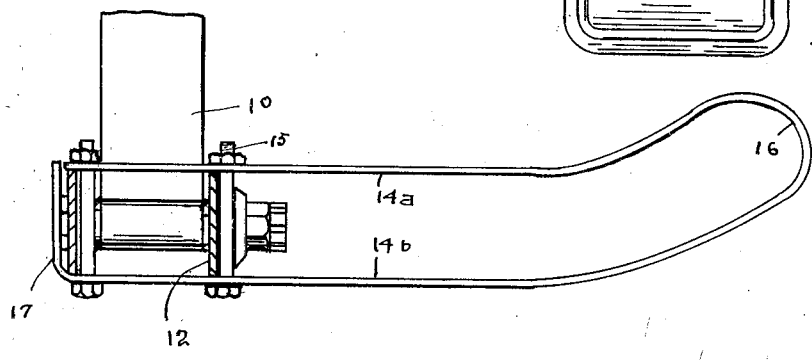
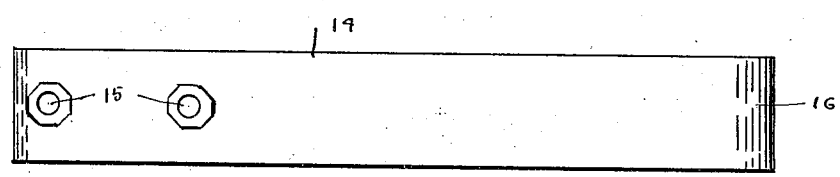
INVENTOR.
MORRIS FORER
BY
Joseph J. O'Brien
ATTORNEY.

Patented Sept. 4, 1923.

1,467,283

UNITED STATES PATENT OFFICE.

MORRIS FORER, OF SPRINGFIELD, MASSACHUSETTS, ASSIGNOR TO FENDAGARD CORPORATION, A CORPORATION OF MASSACHUSETTS.

FENDER GUARD.

Application filed July 11, 1922. Serial No. 574,325.

*To all whom it may concern:*

Be it known that I, MORRIS FORER, citizen of the United States of America, residing at Springfield, in the county of Hampden and State of Massachusetts, have invented certain new and useful Improvements in Fender Guards, of which the following is a specification.

This invention relates to improvements in fender guards for automobiles and other motor vehicles and its leading object is to provide a guard for the rear fenders which can be quickly attached in position and which will not require additional floor space for the storage of a car after it has been installed.

Another object of the invention is to provide a guard for each of the rear fenders which can be supported at one end thereof and provide a cantilever spring guard projecting outwardly in confronting relation to the fender.

With the above and other objects in view the invention consists in certain new and useful combinations, constructions, and arrangements of parts, clearly described in the following specification, and more fully illustrated in the accompanying drawings, in which:

Fig. 1 is a plan view showing an automobile equipped with my improved fender guard.

Fig. 2 is a plan view of one of the fender guards, showing the shackle in cross section, and a portion of the fender.

Fig. 3 is a rear end elevation of the fender guard.

Referring to the accompanying drawings, 5 designates an automobile or similar vehicle supported on the usual wheels 6.

The usual fenders 7 and 8 are mounted on the body 5, over the rear wheels, and in accordance with common practice a spare tire 9 is mounted on the rear end of the body. The rear springs 10 and 11 are shown to extend rearwardly of the body in accordance with standard practice and each spring is provided with a shackle 12 connecting the lower leaf with the extending arm of the frame. The shackles 12 are supported between the frame and springs so as to lie in substantially the same vertical plane as the spare tire 9. This construction is old and well known.

On each shackle 12 a fender guard 14 is bolted or supported, by fastening elements or bolts 15. Each fender guard consists of a frame formed of flat stock or spring metal and bent upon itself to provide a loop 16 on one end and an angular stop or abutment 17 on the opposite end. The bolts 15 extend through the spaced sides or shackle jaws 14ª and 14ᵇ of the guards 14, one bolt extending between the members of the shackle and the other bolt extending on one side of the shackle. The terminal loop 16 projects outwardly in confronting relation to the terminal portion of its fender.

It will be seen that a guard is supported on one end of the right spring to protect the right fender, and a similar guard is supported at one end of the left spring to protect the left fender. Should the vehicle back into any obstacle or car, so as to expose the right or left fenders to danger the guard therefor will receive the shock and ordinarily prevent the crushing of the fender. When a spare tire is positioned between the right and left fender guards the spare tire and the two guards provide complete protection for the rear end of the vehicle.

The fender guards may be supported directly on the body or otherwise connected to the spring as is here shown and described. When supported in place each fender guard provides a cantilever protective guard for its fender and when a shock is placed upon the end portion of the guard the shock is distributed over the rear spring with which it is connected, thus insuring that the shock will be resisted, without destroying the fender or the body.

When an obstacle engages the side or bar 14ᵇ, the load imposed upon it is transferred to the side or bar 14ª by the loop 16, which places the side 14ª under pressure to force it against the stop 17, carried by the side or bar 14ᵇ, which resists further movement to a substantial extent.

Having described my invention, I claim:

1. The combination with a vehicle having a rearwardly extending spring provided with a shackle and a rear fender guard mounted at its inner end on said shackle and extending laterally thereform.

2. The combination with a vehicle having rearwardly extending springs provided with shackles, a wheel fender located outwardly of each spring, and a fender guard for each fender having its inner end clamped to the shackle of the adjacent spring and its outer end supported thereby in protecting position in confronting relation to the adjacent fender.

3. The combination with a road vehicle having rear springs, rear wheels, and fenders overlying the wheels; of a separate fender guard for each wheel, each fender guard being provided with clamping means at its inner end having connection with the spring and supporting the guard laterally thereof, the inner ends of the fender guards being spaced from each other to provide a spare tire clearance at the rear end of the vehicle.

4. Separate rear fender guards each consisting of a member folded upon itself to provide opposing spring bars, one of which is provided with a terminal stop projecting toward the other bar.

5. A combination with a road vehicle having rear wheels, independent fenders therefor, and rearwardly extending springs consisting of upper and lower members, and shackles connecting said members to each other, said shackles being supported rearwardly on the vehicle, of a fender guard for each fender having detachable clamping engagement with one shackle and supported thereby laterally of the spring to protect the adjacent fender.

6. A fender guard consisting of a member having a spring loop on one end and shackle clamping jaws on the opposite end whereby the member can be clamped to a spring shackle to support the loop laterally thereof.

7. A fender guard consisting of a spring member having shackle engaging jaws on one end thereof and means for clamping said jaws to a spring shackle to support the body of the member laterally of the spring shackle.

8. An impact receiving device for road vehicles consisting of a member having spaced shackle gripping jaws on one end thereof, and means for clamping said jaws to a spring shackle to support the body of the member laterally thereof.

9. The combination with a vehicle having a body and rear wheels, wheel fenders therefor, extending rearwardly thereof, rear springs supporting the vehicle body on the rear wheels, a spare tire mounted against the vehicle body between the rear springs to provide an obstacle resisting element and a fender guard for each fender having supporting connection at its inner end to the spring adjacent to each fender and extending laterally thereof in yielding guarding relation to the adjacent fender, the inner ends of the fender guards being spaced apart to expose the rear side of the spare tire, whereby said spare tire and the fender guards compose rear end protection for the vehicle, substantially equal to the width of the vehicle at its rear end.

Signed by me at Springfield, Mass.

MORRIS FORER.